(12) United States Patent
Salkeld

(10) Patent No.: US 8,534,598 B2
(45) Date of Patent: Sep. 17, 2013

(54) DIRECT FLIGHT FAR SPACE SHUTTLE

(76) Inventor: Robert Salkeld, Sante Fe, NM (US)

( * ) Notice: Subject to any disclaimer, the term of this patent is extended or adjusted under 35 U.S.C. 154(b) by 96 days.

(21) Appl. No.: 12/115,324

(22) Filed: May 5, 2008

(65) Prior Publication Data

US 2009/0140101 A1 Jun. 4, 2009

Related U.S. Application Data

(63) Continuation-in-part of application No. 11/871,892, filed on Oct. 12, 2007, now abandoned.

(60) Provisional application No. 60/829,179, filed on Oct. 12, 2006.

(51) Int. Cl.
| | | |
|---|---|---|
| *B64G 1/10* | (2006.01) | |
| *B64G 1/14* | (2006.01) | |
| *B64G 1/60* | (2006.01) | |
| *B64G 1/62* | (2006.01) | |

(52) U.S. Cl.
USPC .... 244/63; 244/159.3; 244/171.3; 244/171.9; 244/173.3

(58) Field of Classification Search
USPC .......... 244/159.3, 171.3, 158.5, 158.9, 172.1, 244/171.9, 172.4, 173.3, 63
See application file for complete search history.

(56) References Cited

U.S. PATENT DOCUMENTS

| | | | | |
|---|---|---|---|---|
| 3,702,688 A | * | 11/1972 | Faget | 244/159.3 |
| 3,910,037 A | * | 10/1975 | Salkeld | 60/250 |
| 4,265,416 A | * | 5/1981 | Jackson et al. | 244/159.3 |
| 4,802,639 A | * | 2/1989 | Hardy et al. | 244/2 |
| 5,090,642 A | | 2/1992 | Salkeld | |
| 5,397,082 A | * | 3/1995 | Scott | 244/171.3 |
| 5,681,011 A | * | 10/1997 | Frazier | 244/158.5 |
| 6,029,928 A | * | 2/2000 | Kelly | 244/63 |
| 6,059,235 A | * | 5/2000 | Meissinger et al. | 244/171.3 |
| 6,068,211 A | | 5/2000 | Toliver et al. | |
| 6,193,187 B1 | | 2/2001 | Scott et al. | |
| 6,446,905 B1 | * | 9/2002 | Campbell et al. | 244/159.3 |
| 6,557,803 B2 | | 5/2003 | Carpenter et al. | |
| 6,666,409 B2 | | 12/2003 | Carpenter et al. | |
| 6,827,313 B1 | * | 12/2004 | Aldrin | 244/158.9 |
| 6,913,224 B2 | * | 7/2005 | Johansen | 244/158.5 |
| 6,932,302 B2 | | 8/2005 | Martin | |
| 7,131,613 B2 | * | 11/2006 | Kelly | 244/171.4 |
| 2003/0080241 A1 | * | 5/2003 | Shpigler et al. | 244/2 |
| 2007/0136032 A1 | * | 6/2007 | Leland et al. | 703/2 |

OTHER PUBLICATIONS

"Manned Space Flight: Apollo", 1967, National Aeronautics and Space Administration, NASA Facts NF-23/vol. IV, No. 7, pp. 1-16.*

(Continued)

*Primary Examiner* — Tien Dinh
*Assistant Examiner* — Richard R Green
(74) *Attorney, Agent, or Firm* — Philip D. Askenazy; Peacock Myers, P.C.

(57) ABSTRACT

A vehicle and method for enabling propulsive flight from suborbital altitudes and velocities directly to far space, or beyond Low Earth Orbit (LEO), preferably without requiring injection into or refueling in LEO. The vehicle is preferably reusable and can withstand re-entry speeds and temperatures higher than those that are typical for LEO vehicles. The vehicle preferably lands horizontally, for example on a runway. The vehicle forms the upper stage of a booster vehicle system which can be launched either from the ground or from a subsonic air platform. The vehicle may optionally be used for LEO missions.

11 Claims, 17 Drawing Sheets

(56) References Cited

OTHER PUBLICATIONS

Salkeld, R., "Geolunar Shuttle: Earth-Based and Moon-Based", *53rd International Astronautical Congress, The World Space Congress 2002* Houston, Texas Oct. 10, 2002, 1-11.

Milstein, Michael, "Super Duper Jumbo" *AIR and SPACE Smithsonian* vol. 21, No. 2 Jul. 2006, 23-27.

Salkeld, Robert et al., "A Reusable Space Vehicle for Direct Descent from High Orbits", *Aeronautics and Astronautics* American Institute of Aeronautics and Astronautics Apr. 1981, 46-47, 63.

Salkeld, Robert J., "Comparison of Separate and Integral Spacecraft", *J. Spacecraft*, vol. 6, No. 11 Nov. 1969, 1315-1316.

Salkeld, Robert, "Geolunar Shuttle as Upper Stage for Heavy Earth Launchers", *56th International Astronautical Congress*, Fukuoka, Japan 2005.

Salkeld, Robert, "Geolunar Shuttle: Earth Launch Options; Growth Using Lunar Propellants", *52nd International Astronautical Congress*, Toulouse France International Astronautical Federaion, Paris, France Oct. 1-5, 2001, 1-10.

Salkeld, R. et al., "Mixed-Mode Propulsion Systems for Full Capability Space Tugs", *21st AAS Annual Meeting, Space Shuttle Missions of the 80's*, Denver, CO. Aug. 1975, 1-15.

Salkeld, Robert J., "Multiple-based Air and Ground Launch for Inspection, Rescue and Other Space Missions", *AIAA Journal of Spacecraft and Rockets* vol. 6, No. 12 Dec. 1969, 1448-1453.

Salkeld, Robert, "Single-Stage Shuttles for Ground Launch and Air Launch", *Astronautics & Aeronautics* Mar. 1974, 52-64.

Salkeld, R., "Space Rescue and Other Space Operations from Existing Airstrips", *XXVII Congress, International Astronautical Federation*, Anaheim, California International Academy of Astronautics, Paris, France Oct. 10-17, 1976.

* cited by examiner

DIRECT FLIGHT FAR SPACE SHUTTLE

CROSS-REFERENCE TO RELATED APPLICATIONS

This application is a continuation-in-part application of U.S. patent application Ser. No. 11/871,892, entitled "Direct Flight Far Space Shuttle", filed on Oct. 12, 2007, which claims priority to and the benefit of the filing of U.S. Provisional Patent Application Ser. No. 60/829,179, entitled "Direct Flight Geolunar Personnel Shuttle", filed on Oct. 12, 2006, and the specifications and claims thereof are incorporated herein by reference.

BACKGROUND OF THE INVENTION

1. Field of the Invention (Technical Field)

The present invention relates to far space Earth launch and shuttle transportation vehicle systems.

2. Description of Related Art

Note that the following discussion refers to a number of publications by authors and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Familiar far space personnel vehicle concepts include non-propulsive ballistic capsules such as the non-reusable American Apollo Command Module, as well as reusable non-propulsive concepts such as the Ballistic Crew Exploration Vehicle now under development. Other far space concepts include reusable propulsive aerodynamically lifting and horizontal Earth landing shuttles such as in accordance with U.S. Pat. No. 5,090,642, Feb. 25, 1992. These prior art shuttles start from low Earth orbit (LEO), which is defined herein as having an altitude of less than approximately 1000 km, but do not participate in an Earth ascent launch. Typically, one or more stages are required to reach LEO, and then another stage is required to go to a higher orbit.

BRIEF SUMMARY OF THE INVENTION

The present invention is a reusable upper stage of a space vehicle for performing direct flight. The upper stage preferably comprises a thrust-to-mass ratio of between approximately 1 and approximately 0.25. The upper stage is preferably configured for horizontal Earth landing. The upper stage preferably comprises a fineness ratio between approximately 7 and approximately 8. The upper stage is optionally configured to carry six personnel with life support, environmental control and power provisions for missions up to 10 days. The upper stage preferably comprises a sufficiently high hypersonic lift to drag ratio to enable efficient re-entry from far space, preferably approximately 3. The upper stage optionally utilizes dual fuel propellant, preferably comprising oxygen-hydrocarbon-hydrogen propellant. The upper stage alternatively optionally utilizes single fuel propellant, preferably comprising oxygen-hydrogen propellant. The upper stage preferably comprises an internal flight deck. The upper stage is optionally configured to load and unload cargo at a back end of the upper stage. The upper stage preferably comprises external propellant tanks and/or external cargo pods and/or an external moon lander.

The present invention is also a space vehicle consisting essentially of a booster and the aforesaid upper stage. The booster is preferably launched from the ground or from an air launch platform.

The present invention is also a method of travelling to far space, the method comprising the steps of launching a space vehicle comprising a booster and a reusable propulsive upper stage; activating upper stage propulsion at a suborbital altitude; and the upper stage performing direct flight; wherein the upper stage does not enter or exit Low Earth Orbit during ascent to far space. The launching step preferably comprises launching from the earth's surface or from an air launch platform. The method preferably further comprises the step of decelerating the upper stage in preparation for re-entry. The method preferably further comprises the step of the upper stage re-entering Earth's atmosphere from far space. The method preferably further comprises the step of the upper stage landing horizontally on Earth's surface. The landing step optionally comprises gliding.

An object of the present invention is to provide a vehicle and techniques for improved personnel and/or cargo transport between the Earth and far space.

Another object of the present invention is to provide a vehicle system in which a reusable personnel and/or cargo transporter preferably functions as both the upper ascent stage of an Earth launch vehicle and as a far space shuttle performing horizontal landing Earth return, within present-day practical limits.

Another object of the present invention is to provide direct personnel flight from the Earth surface into far space transfer trajectories without any pause in low Earth orbit (LEO).

A further object of the present invention is to provide direct far space personnel flight using a dual-functioning apparatus enabling reduced vehicle complexity and cost, reduced flight time and improved overall safety and reliability.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate several embodiments of the present invention and, together with a description, serve to explain the principles of the invention. The drawings and the dimensions therein are only for the purpose of illustrating one or more particular embodiments of the invention and are not to be construed as limiting the invention. The boosters, engines, and other components depicted in the drawings are simply used for example purposes and are not to be construed as limiting the present invention. In the figures.

DETAILED DESCRIPTION OF THE INVENTION

Figure 1A:
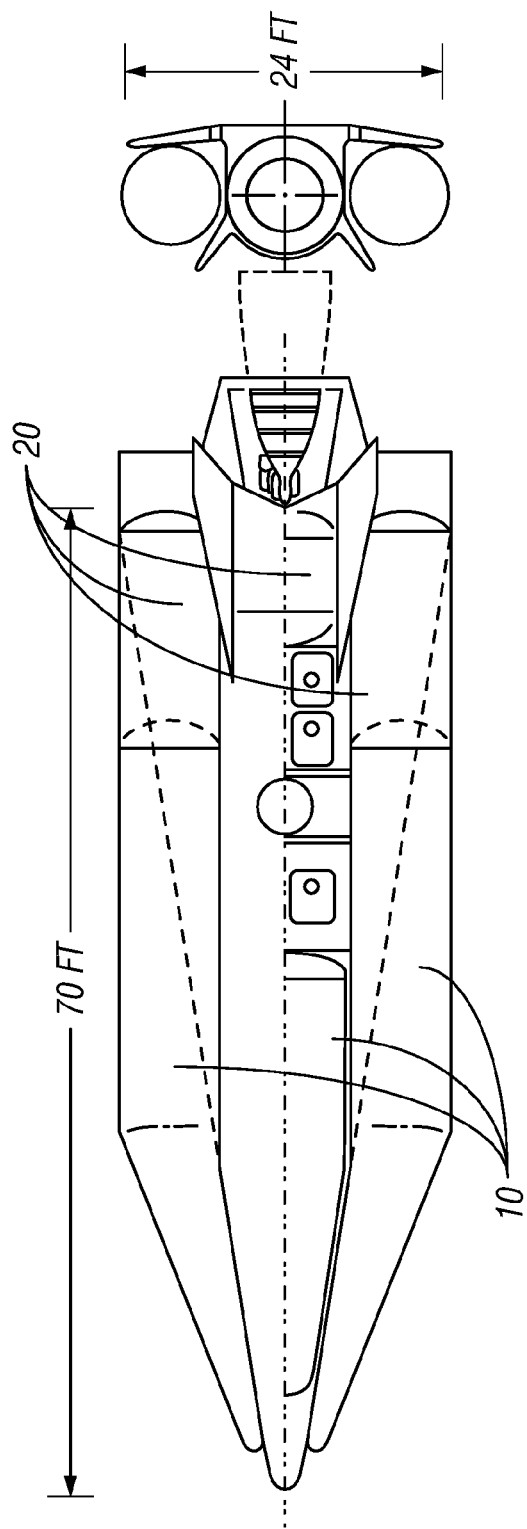
FIGS. 1A-1D depict embodiments of a personnel-only direct flight far space vehicle of the present invention.

The present invention encompasses a vehicle for transporting personnel and/or cargo that preferably substantially participates in an Earth launch as the transatmospheric upper stage for Earth launchers, as disclosed in IAC 05-D2.3.08, "Geolunar Shuttle as Upper Stage for Heavy Earth Launchers," 56th IAC, Fukuoka, Japan, October 2005. This invention optionally comprises a personnel shuttle with a suitable booster that can be air launched from a horizontal takeoff subsonic aircraft such as introduced in papers: 1) "Single-Stage Shuttles for Ground Launch and Air Launch", *Astronautics and Aeronautics*, Vol. 12, No. 3, March 1974; 2) "Space Rescue and Other Space Missions from Existing Airstrips", IAF-A-76-06, XXVI IAC, Anaheim, Calif., Oct. 1976. The entire contents of the aforesaid publications are incorporated herein by reference.

The present invention preferably allows for direct flight from upper stage suborbital ignition (i.e. during ascent to orbit) to far space, and a return to Earth preferably utilizing a horizontal landing, while bypassing the steps of injecting into and ejecting from LEO. The invention also replaces the conventional expendable upper stage booster. The start thrust-to-weight ratio for the vehicle of the present invention is preferably less than or equal to approximately 1, can be as low as about 0.25 and can be the same for both an Earth launcher upper stage and a reusable far space transfer shuttle. Thus, the same vehicle can perform both functions, that is be the upper stage of an Earth launcher and a far space transfer shuttle. The low thrust-to-weight ratio can be achieved while still providing sufficient propulsion to reach far space.

This novel self-launch, integration step combining the functions of an expendable Earth ascent upper stage with those of a far space shuttle, in the same vehicle, confers at least five new benefits: 1) elimination of the costs incurred by an expendable upper stage; 2) elimination of the performance penalties incurred by injection into and ejection from LEO; 3) elimination of time spent in LEO during which the far space shuttle is vulnerable to simple inexpensive ground fire; 4) reduction of far space trip time and associated life support and power weight requirements; and 5) simplification, reliability and safety improvement for the overall transportation mission.

As used throughout the specification and claims, "far space" means any orbit, altitude, or earth escape beyond Low Earth Orbit (LEO), including but not limited to Medium Earth Orbit (MEO), Low Moon Orbit (LMO), Geosynchronous Orbit (GEO), or any Earth-Moon libration or Lagrange point. The orbit may have any inclination, eccentricity, or direction.

As used throughout the specification and claims, "direct flight" means a propulsive flight that provides thrust and velocity increase which starts from a suborbital condition (but above the earth's surface) and proceeds directly to a desired far space location.

As used throughout the specification and claims, "booster" means a detachable portion of a launch vehicle, at least a part of which portion is ignited either at the Earth's surface or from an air launch platform such as an aircraft. A booster may comprise more than one booster stage, where "stage" means a propulsive unit that comprises both its own propellant and at least one engine. An example of a booster is the booster portion of a heavy Earth launcher.

The present invention is directed to a system including a process and apparatus for the delivery and return of personnel and cargo, including but not limited to high value, special mission, ascent, or Earth return cargo, between the Earth and far space, and preferably comprises a reusable propulsive vehicle which functions as both the transatmospheric upper stage in an Earth liftoff and ascent trajectory and as a far space shuttle. The vehicle preferably comprises a reusable propulsive dart-shaped vehicle, preferably comprising a high hypersonic lift-to-drag ratio of approximately 3, enabling aerodynamic maneuverability which can be used for timely deployment and manageable re-entry from far space preferably to horizontal landing, e.g. on a runway, at any location on Earth. Such a landing is typically, though not limited to, a gliding landing. It is preferably compatible with any suitably capable expendable or reusable Earth liftoff first stage booster. Lifted to high altitude within the atmosphere preferably by the first ignition booster stage(s), the contemplated vehicle can continue directly to far space. The vehicle preferably comprises a single upper stage preferably comprising an initial thrust-to-mass ratio as low as about 0.25. The present invention may optionally be air launched from a horizontal takeoff aircraft. In this embodiment, smaller first ignition boosters may be employed. The far space vehicle of the present invention may optionally be used to transport personnel and cargo to and from LEO.

In one embodiment, the vehicle is designed to carry six personnel with life support, environmental control and power provisions for ten-day missions, and optionally comprises no dedicated internal cargo bay such as in the first generation NASA shuttle. Internal volume designed for personnel and their provisions can be exchanged for other limited high value cargo. The contemplated reusable vehicle incorporates internally its own ascent propellants and may optionally carry external propellants in expendable drop tanks to provide adequate overall vehicle performance, as well as external pods to accommodate ascent-only cargos.

In another embodiment, the vehicle, with reduced ascent propellants of its own and a smaller launch booster, may be employed as a shuttle for LEO missions, in which ascent-only cargos may, for example, include propellants for high-velocity LEO and other special missions.

The vehicle preferably incorporates and consolidates performance, economic and operational advantages of two individual system concepts: 1) combining propulsive elements (i.e. propellant and engine systems) with mission elements (i.e. personnel, cargo and control systems) into an integrated vehicle in place of segmented vehicles, which confers performance gains and shared structural and subsystem benefits (see "Comparison of Separate and Integral Spacecraft," *AIAA Journal of Spacecraft and Rockets*," Vol. 6, No. 11, November 1969, incorporated herein by reference); and 2) employing a slim, high-fineness-ratio (for example, between approximately 7 and approximately 8) aerodynamic shape facilitates direct superorbital re-entry from far space distances, using its inherent high hypersonic lift-to-drag ratio to remain at high altitude long enough to dissipate thermal energy until decelerated to LEO velocity, from which final decent can be made within established thermostructural technologies, and with long cross range maneuver and horizontal landing (see "New Concept for Far Orbit Transportation," IAF-80-F-243, XXXI IAC, Tokyo, Japan, September 1980, incorporated herein by reference). Configuration and aerothermodynamic features of such a propulsive high-fineness vehicle are discussed in U.S. Pat. No. 5,090,692 and in "Geolunar Shuttle: Earth Launch Options; Growth Using Lunar Propellants," IAF-01-V.3.09, 52$^{nd}$ IAC, Toulouse, France, October 2001, which references are both incorporated herein by reference.

Because the vehicle of the present invention would typically re-enter earth's atmosphere from far space, its re-entry velocity will be closer to approximately 7 miles per second, rather than the approximately 5 miles per second for vehicles re-entering from LEO. Thus the present vehicle preferably comprises a slim dart configuration, preferably comprising highly swept wings, as shown in the figures. This provides a sufficiently high lift to drag to optionally enable deceleration to LEO velocities if desired. Also, this, combined with use of advanced structural materials, provides resistant to the resulting higher re-entry temperatures. In addition, a new re-entry strategy is required. (See, for example, R. Salkeld, R. Beichel, and R. Skulsky, "A Reusable Space Vehicle for Direct Descent from High Orbits," *Astronautics and Aeronautics* 19, Apr. 19, 1981, pp. 46, 47, and 53, incorporated herein by reference.)

Figure 1B:
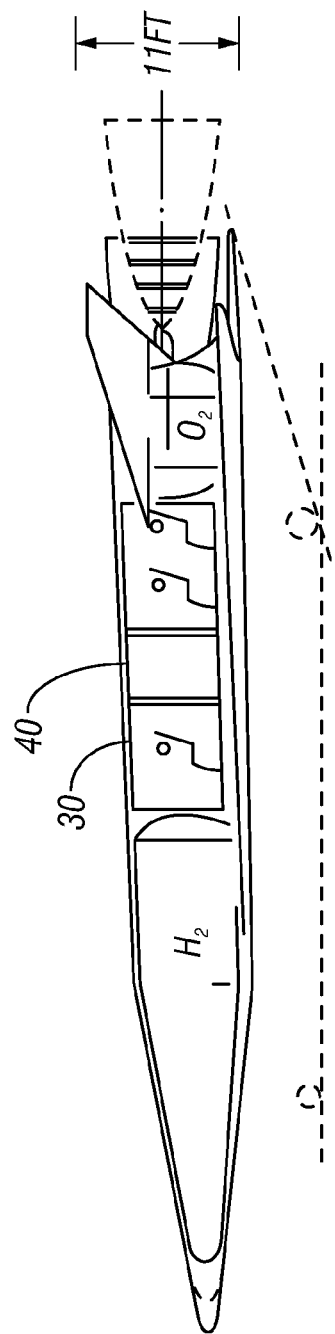
Figure 1C:
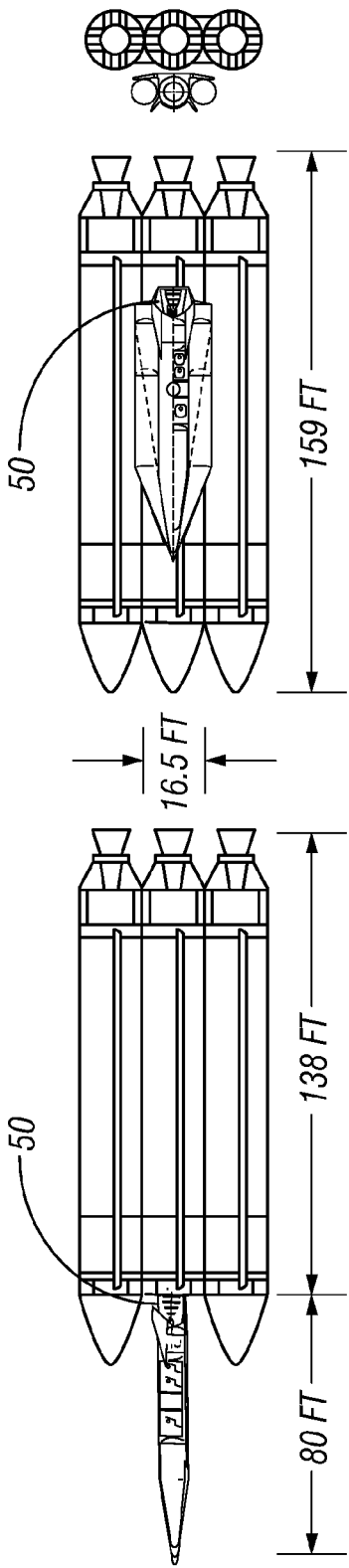
Figure 1D:
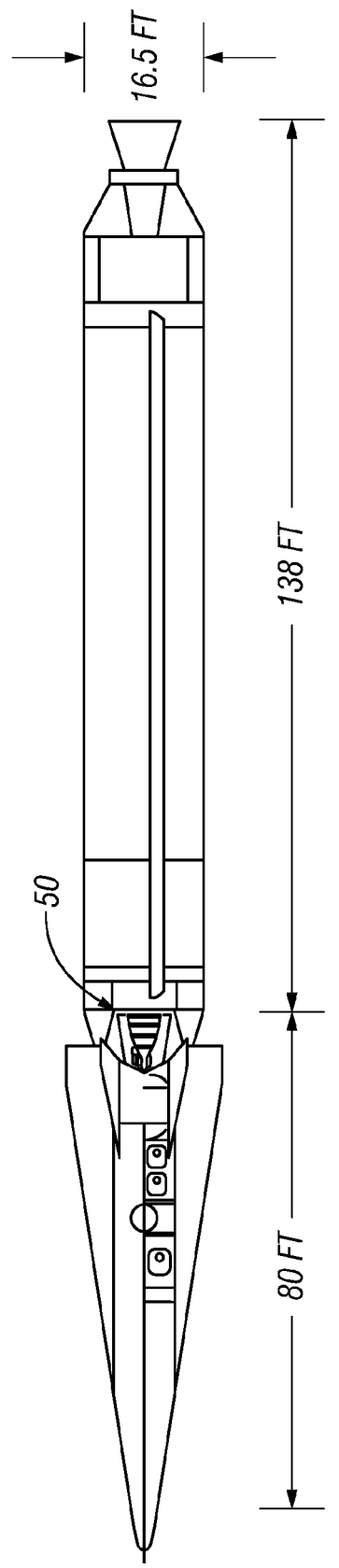

An upper stage personnel-only embodiment of the present invention is shown in FIGS. 1A and 1B. Suggested locations for H$_2$ tanks 10 and O$_2$ tanks 20 are shown. The vehicle preferably comprises internal flight deck (IFD) 30 and airlock 40. Table 1 below lists example cargo capacities, weight limits, engine designs and re-entry data. FIG. 1C depicts an embodiment preferably comprising one RL-60 or MB-60 engine 50 suitable for reaching Low Moon Orbit and other far space shuttle capability beyond LEO; the shuttle is carried by, for example, a ΔIV Heavy Baseline Booster. FIG. 1D depicts an embodiment suitable for reaching LEO wherein the shuttle is carried by, for example, a ΔIV Medium Booster. In this embodiment, a RL10B-2 engine may be used in place of the RL-60 or MB-60 engine, but the vehicle would then be able to only transport less than four tons of cargo. Any other booster or Earth launch concept, including but not limited to the Atlas V or Ariane V ECB, may alternatively be employed.

TABLE 1

| Parameter | Earth-LMO-Earth | Earth-LEO-Earth |
|---|---|---|
| Cargo, round trip | | |
| Personnel (days) | 6(10) | 6(10) |
| Other, (margin) lbm | 1,600 | 9,300 |
| Gross start weight, lbm | 162,300 | 47,300 |
| Dry weight, lbm | 21,500 | 16,000 |
| Engine | 1×RL or MB-60 | 1×RL or MB-60 |
| Reentry planform loading (w/6 people), lbm/ft$^2$ | 18.4 | 18.4 |
| Reentry cross-range, n. mi. | 4,500 | 4,500 |

Figure 2A:
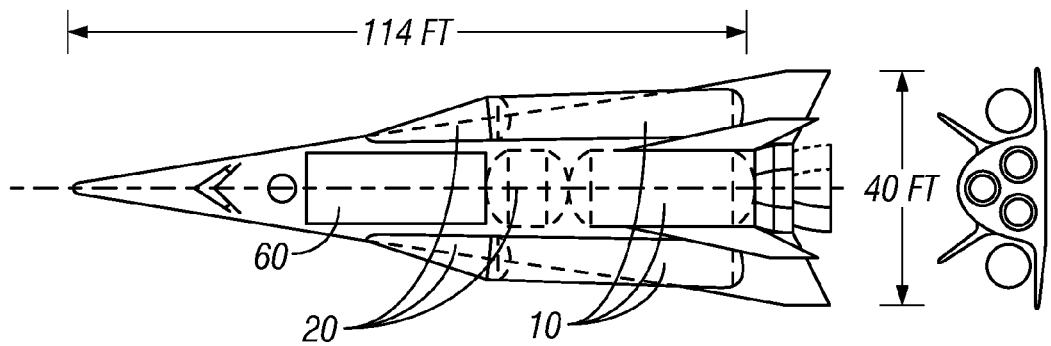
FIGS. 2A-2E depict embodiments of a personnel/cargo direct flight far space vehicle of the present invention.
Figure 2B:
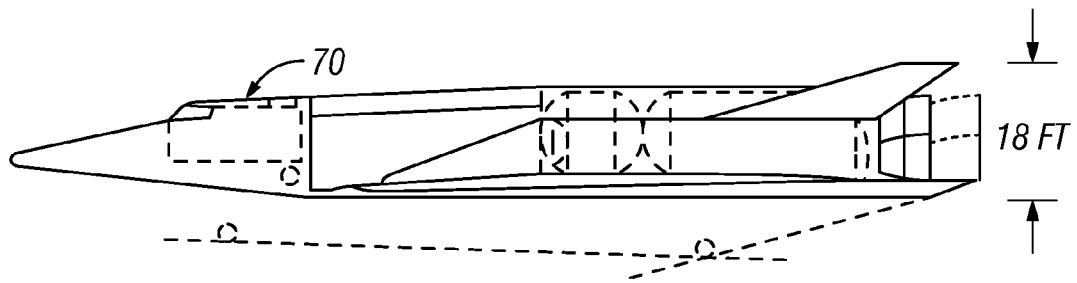
Figure 2C:
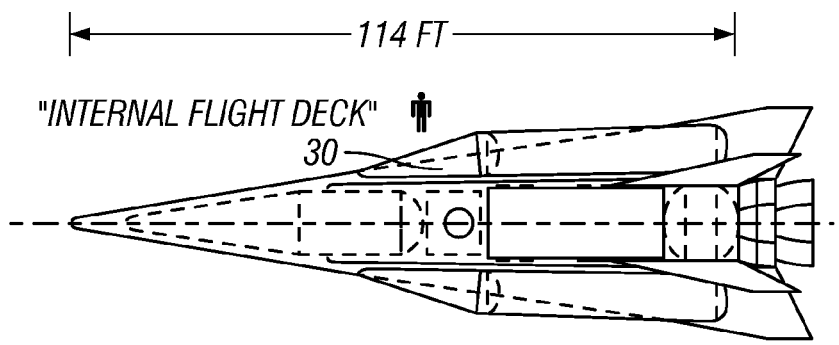
Figure 2D:
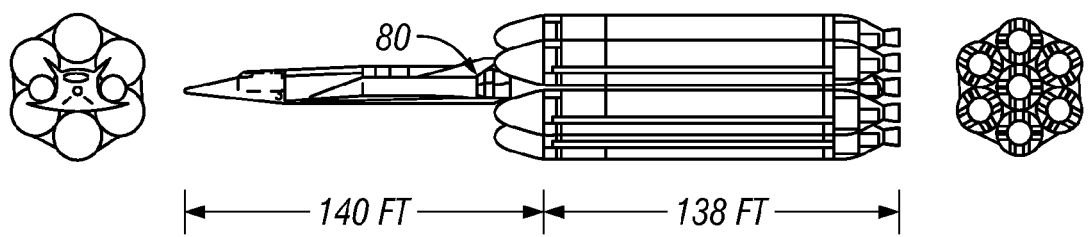
Figure 2E:
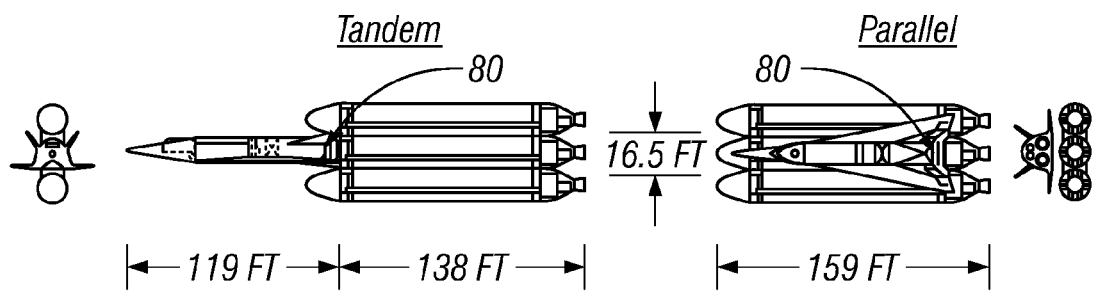

While the previous embodiment is directed toward personnel transportation with no dedicated cargo bay, dedicated cargo carrying capacity, optionally combined with personnel transportation, may alternatively be employed within the vehicle's capability and design. Such a vehicle preferably comprises internal dedicated cargo bay 60, preferably 12×30 feet in size, in addition to the volume allocated for personnel transport, as shown in FIGS. 2A-2E. FIGS. 2A and 2B show a configuration comprising conventional flight deck (CFD) 70. Table 2 illustrates example cargo capacities and other parameters of the vehicle of this embodiment. FIG. 2C shows an alternate configuration comprising internal flight deck 30, with the crew seated near the center of the vehicle instead of at the front. FIG. 2D depicts an embodiment suitable for reaching Low Moon Orbit (LMO) and other far space distances, preferably comprising three RL10B-2 engines 80, wherein the shuttle is carried by, for example, ΔIV Heavy Derivative Booster. FIG. 2E depicts an embodiment suitable for reaching LEO, preferably comprising two RL10B-2 engines 80, wherein the shuttle is carried by, for example, a ΔIV Heavy Baseline booster in either a tandem or parallel configuration. Any other booster or Earth launch concept, including but not limited to the Atlas V or Ariane ECB, may alternatively be employed.

TABLE 2

| Parameter | Earth-LMO-Earth | Earth-LEO-Earth |
|---|---|---|
| Cargo, round trip | | |
| Personnel (days) | 2(10) | 2(10) |
| Other, lbm | 20,700 | 30,200 |
| Gross start mass, lbm | 271,600 | 122,800 |
| Dry mass, lbm | 37,500 | 32,800 |
| Engines (RL10B-2) | 3 | 2 |
| Reentry planform loading (RT cargo), lbm/ft$^2$ | 22.8 | 26.8 |
| Cargo bay, ft | 12 × 30 | 12 × 30 |
| Cargo density (RT cargo), lbm/ft$^2$ | 6.3 | 9.4 |
| Reentry cross-range, n. mi. | ±4,500 | ±4,500 |

The present invention may optionally utilize subsonic air launch to space using existing airstrips, which may have performance, operational and economic benefits (see as introduced in "Multiple-based Air and Ground Launch for Inspection, Rescue and Other Space Missions," *AIAA Journal of Spacecraft and Rockets*, Vol. 6, December 1969, incorporated herein by reference). Current commercial jet engines in the 100,000 lbf thrust class enable development of subsonic aircraft weighing at least two million pounds at takeoff (see "Super Duper Jumbo," *AIR and SPACE Smithsonian*, Vol. 21, No. 2, July/August 2006, incorporated herein by reference). Scaled configurations of the present invention in conjunction with subsonic aircraft and launch platforms are shown in FIGS. 3A-3D and 4A-4C.

Figure 3A:
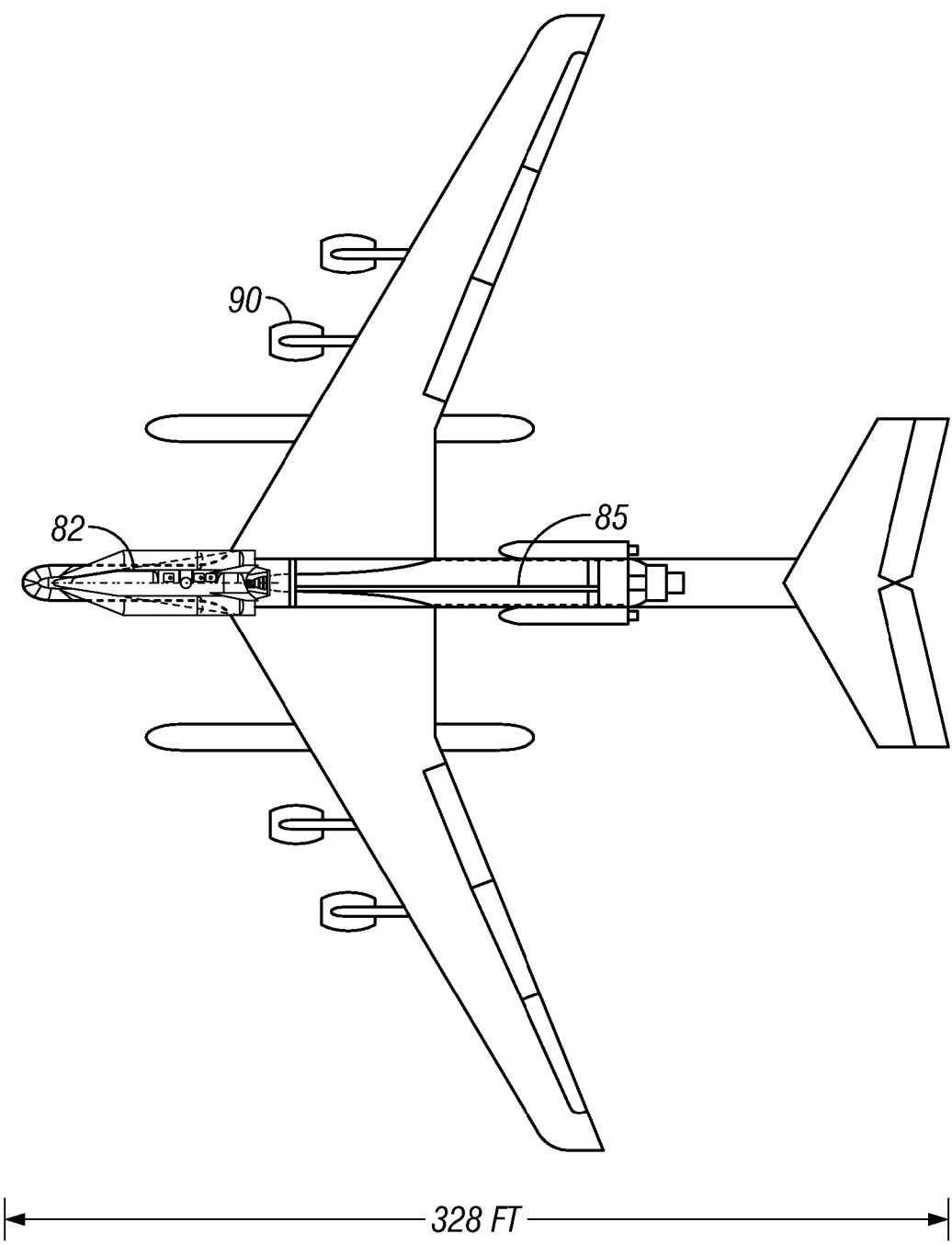
FIGS. 3A-3C depict an air launch embodiment of a personnel-only direct flight far space shuttle utilizing the ΔIV Medium+(5,4) booster.
Figure 3B:
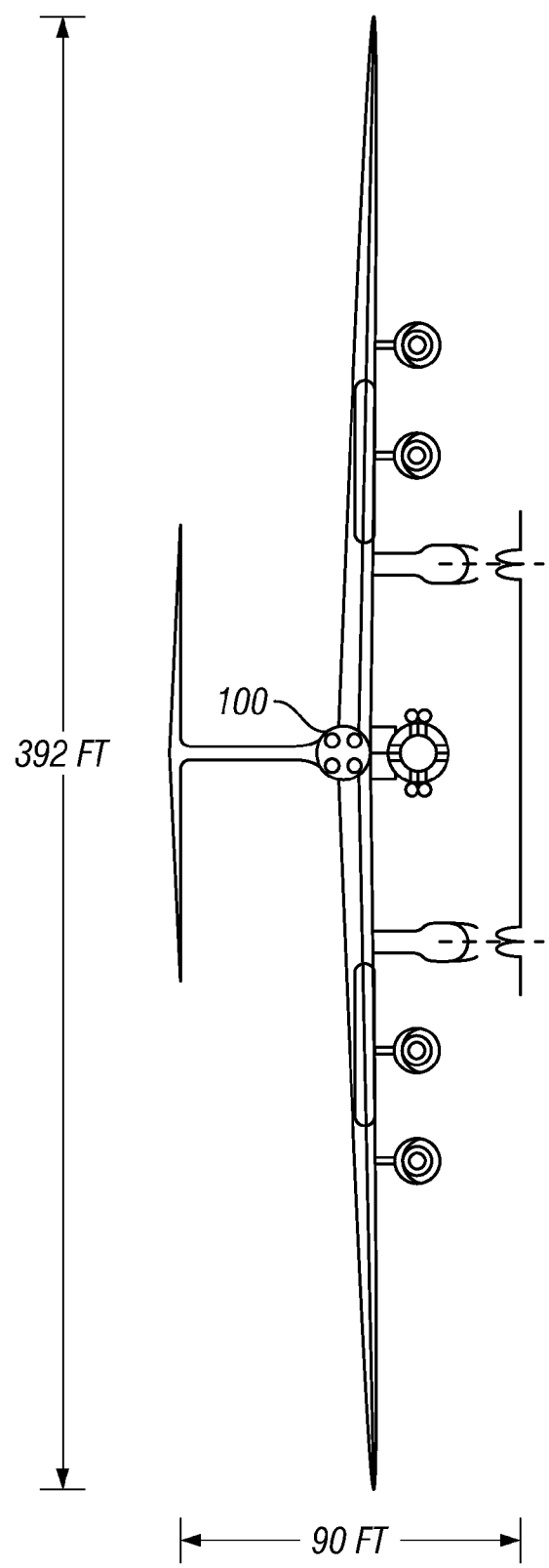
Figure 3C:
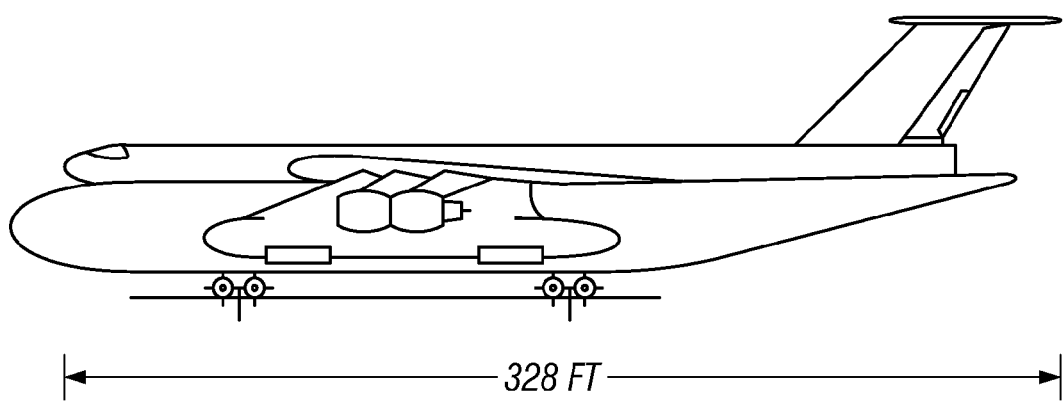
Figure 3D:
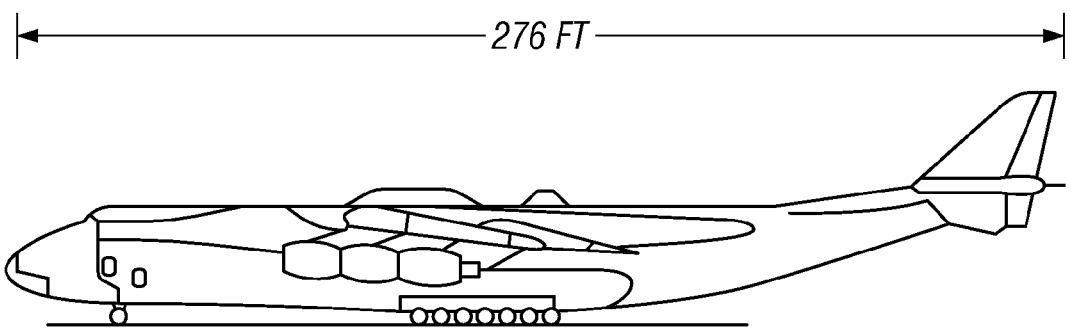
FIG. 3D depicts the existing AN-225 aircraft for size reference.

FIGS. 3A and 3B depict personnel-only direct flight far space shuttle 82 attached to ΔIV Medium+(5,4) booster 85 mounted on a large subsonic air launch platform, which comprises, for example, four GE90-115B engines 90 and optionally 2 or more RD-180 engines 100, and is comparable in scale to the AN-225, currently the world's largest aircraft, shown in FIG. 3D. Use of this booster enables the shuttle to achieve LMO or other far space orbits beyond LEO, for example via rocket assisted pullup with a launch at about 60,000 ft. altitude and a 45° flight path angle. Table 3 contains non-limiting parameters for this embodiment. FIG. 3C shows a subsonic platform carrying an alternate mission pod.

TABLE 3

| Parameter | Aircraft | ΔIV M + (5, 4) Booster | Far space Vehicle Earth-LEO-Earth | Far space Vehicle Earth-LMO-Earth |
| --- | --- | --- | --- | --- |
| Cargo, round trip | | | | |
| Personnel (days) | | | 6(10) | 6(10) |
| Other, lbm | 850,000 | 162,300 | 28,500 | 4,800 |
| Gross start mass, lbm | 1,896,300 | 672,200 | 162,300 | 162,300 |
| Dry mass, lbm | 601,300 | 71,900 | 21,500 | 21,500 |
| Engine(s) | 4xGE-115B 2xRD-180 | 1xRS68 4xGEM-60 | 1xMB-60 RL-60 | 1xMB-60 RL-60 |

Figure 4A:
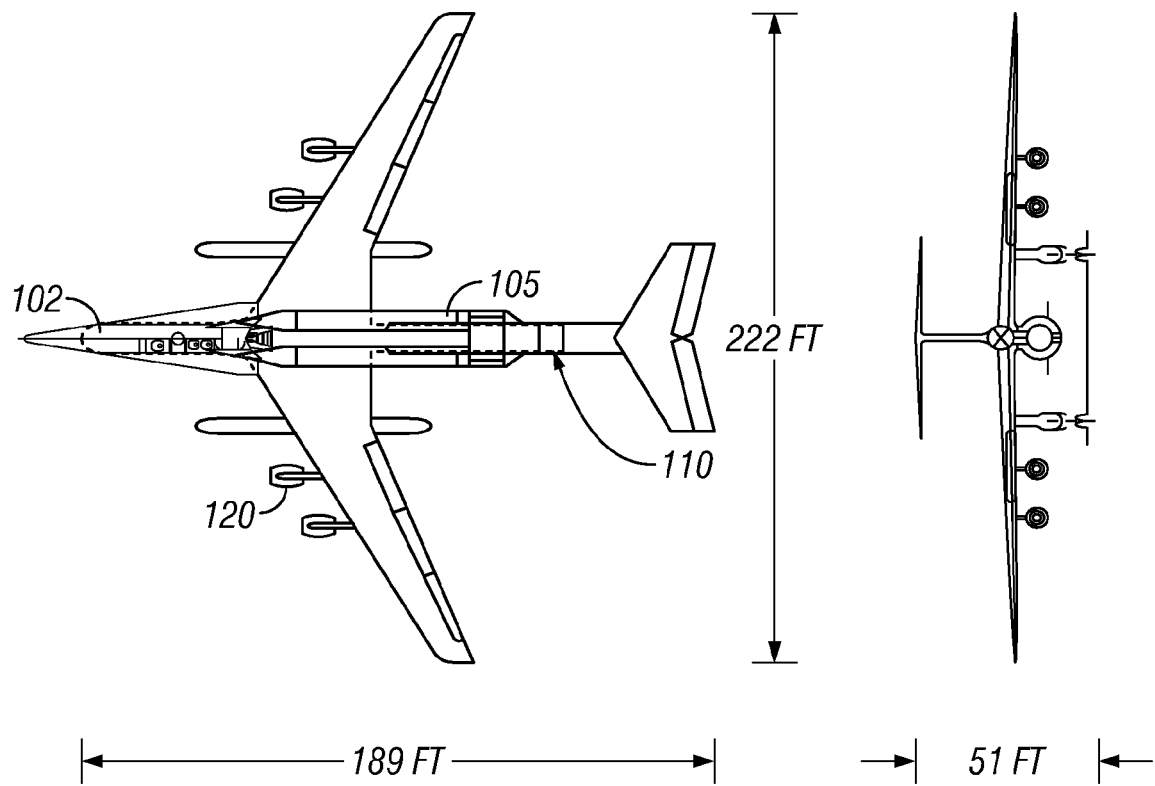
FIG. 4A depicts an air launch embodiment of a personnel-only direct flight far space shuttle utilizing the ΔIV "short" booster.
Figure 4B:
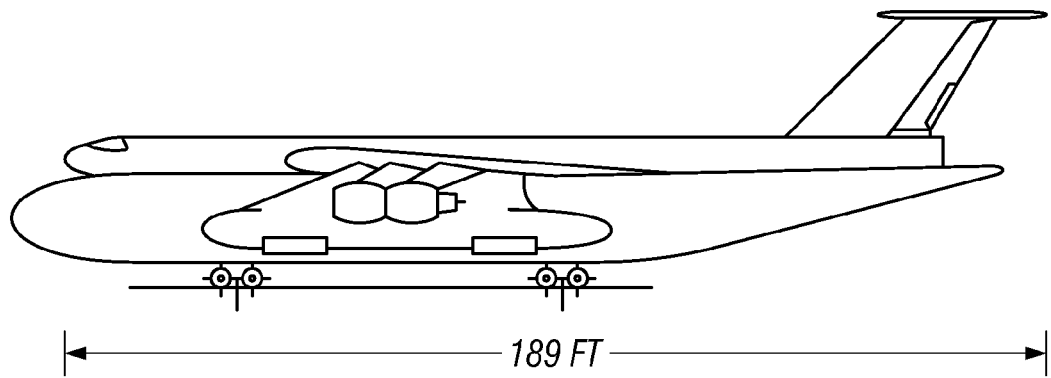
FIG. 4B depicts an alternate use of the air launch platform.
Figure 4C:
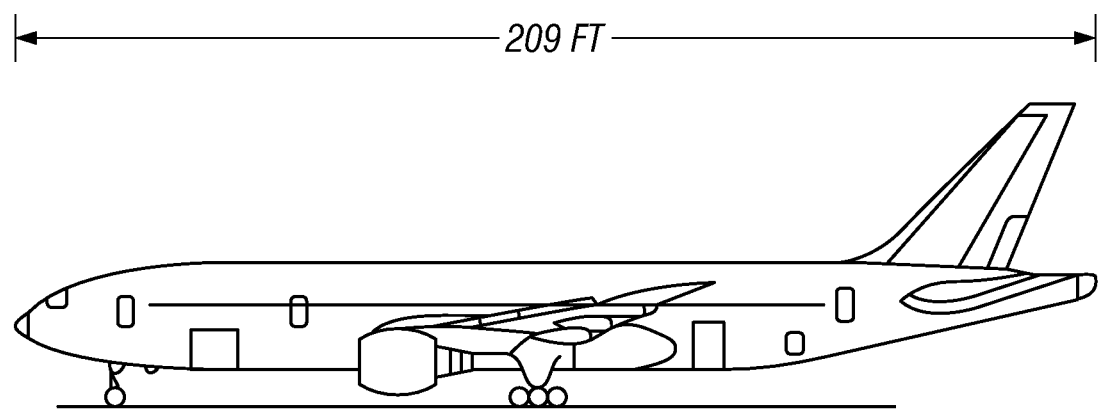
FIG. 4C depicts the existing 777-200 aircraft for size reference.

FIG. 4A depicts personnel-only direct flight far space shuttle 102 attached to ΔIV "short" booster 105, which comprises one RS-68 engine 110, mounted on a subsonic air launch platform which comprises, for example, four JT9D-7J engines 120 and one RD-180 100 engine, and is comparable in scale to the 777-200 aircraft, shown in FIG. 4C. Launch is preferably via rocket assisted pullup with a launch altitude of about 60,000 ft. and a 45° flight path angle. The ΔIV "short" booster is a ΔIV Medium booster modified only by shortening propellant tankage. Table 4 contains non-limiting parameters for this embodiment. FIG. 4B shows a subsonic platform carrying an alternate mission pod.

TABLE 4

| Parameter | Aircraft | "ΔIV Short" Booster | Far space Vehicle Earth-LEO-Earth |
| --- | --- | --- | --- |
| Cargo, round trip | | | |
| Personnel (days) | — | — | 6(10) |
| Other, lbm | 280,000 | 47,300 | 2,300 |
| Gross start mass, lbm | 628,900 | 233,000 | 47,300 |
| Dry mass, lbm | 229,600 | 27,900 | 16,000 |
| Engine(s) | 4xJT9D-7J 1xRD-180 | 1xRS-68 | 1xMB-60 or RL-60 |

Oxygen-Hydrogen Propulsion

The present invention can incorporate single-fuel (oxygen-hydrogen or $O_2$-$H_2$) propulsion or dual fuel (oxygen-hydrocarbon-hydrogen, or $O_2$-MMH-$H_2$) propulsion. In the previous example embodiments, although oxygen-hydrogen is depicted because the appropriate engines (RL10B-2, RL-60, and MB-60) are in service or under development, any fuel may be employed. In one embodiment, the dimensions of the shuttle vehicle closely match those of the Delta IV Heavy upper-stage/payload assembly, and both use the same RL10B-2 engine.

Figure 5A:
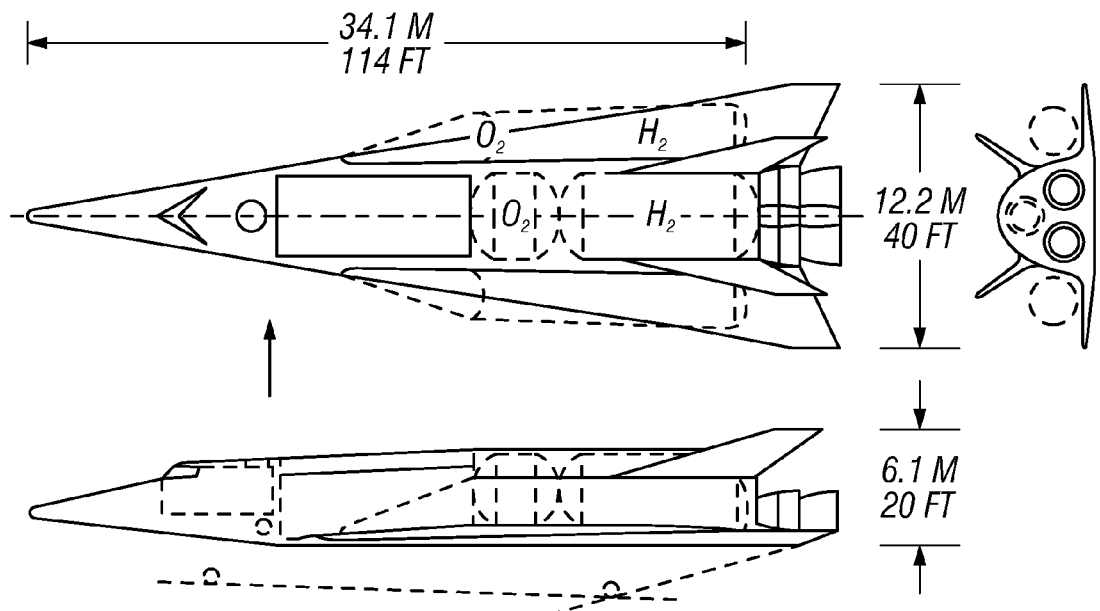
FIGS. 5A-5B depict single fuel CFD and IFD configurations of the present invention.
Figure 5B:
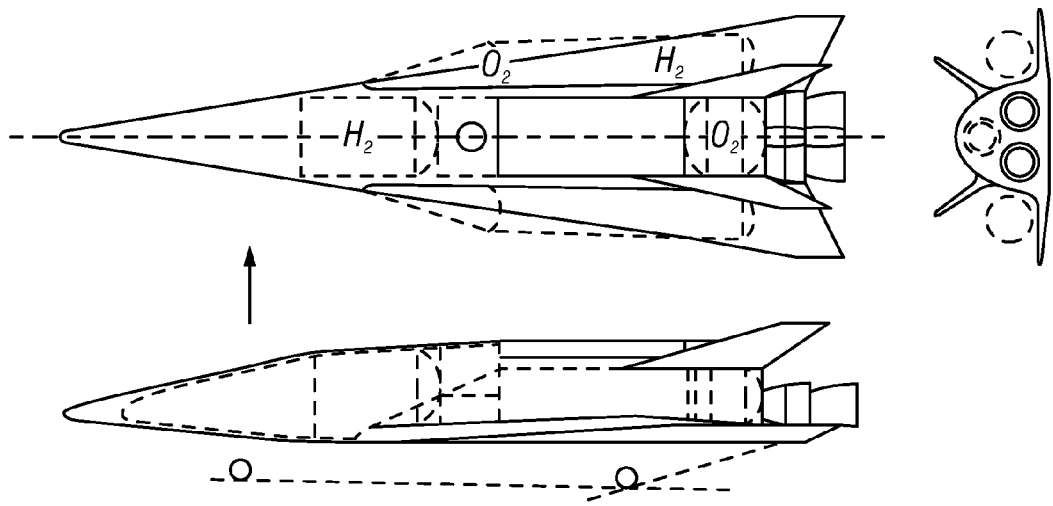

If the propellant loading of the contemplated vehicle is controlled to match the start mass of the Delta IV Heavy upper-stage/payload start mass, which may not be an optimal condition, then estimating the subsequent vehicle ascent performance can be performed for three modes of operation: 1) ascent to LEO as a next generation LEO vehicle; 2) refueling in LEO and ascent to and return from far space, as a far space vehicle; and 3) direct ascent to and return from far space, from liftoff and boost by an earth launcher, for example a 7-segment Delta IV Heavy Derivative Earth launcher. Two possible vehicle configurations are a Conventional Flight Deck (CFD) vehicle, shown in FIG. 5A, or an aft-shifted control station and cargo bay or Internal Flight Deck (IFD) vehicle, shown in FIG. 5B. For essentially the same vehicle mold lines, the IFD option offers improved vehicle balance, more efficient internal volume utilization, and increased propellant capacity resulting in 30-40 percent increases in far space round trip cargo to dry mass and cargo to gross mass ratios when fully refueled in LEO. However, round trip LEO and direct flight far space cargos are reduced 5-10% because of the assumed constraint on the ascent start mass. Table 5 shows various parameter values for these configurations.

TABLE 5

| | Conventional Flight Deck | | | Internal Flight Deck | | |
| --- | --- | --- | --- | --- | --- | --- |
| | Delta IV Heavy Launcher | | | | | |
| | Baseline | Deriv. (7 Seg.) | | Baseline | Deriv. (7 seg.) | |
| | Destination | | | | | |
| Parameter | LEO | LMO (LEO Refuel) | LMO (Direct flight) | LEO | LMO (LEO Refuel) | LMO (Direct flight) |
| Cargo, round trip, kgm | 13,700 | 7,600 | 9,400 | 13,200 | 10,700 | 8,400 |
| Gross start weight, kgm | 55,700 | 73,000 | 123,200 | 55,700 | 84,100 | 119,200 |
| Dry Weight, kgm | 14,900 | 14,900 | 17,000 | 15,300 | 15,300 | 17,800 |
| Engines (RL10B-2) | 2 | 2 | 3 | 2 | 2 | 3 |

TABLE 5-continued

| | Conventional Flight Deck | | | Internal Flight Deck | | |
|---|---|---|---|---|---|---|
| | Delta IV Heavy Launcher | | | | | |
| | Baseline | Deriv. (7 Seg.) | | Baseline | Deriv. (7 seg.) | |
| | Destination | | | | | |
| Parameter | LEO | LMO (LEO Refuel) | LMO (Direct flight) | LEO | LMO (LEO Refuel) | LMO (Direct flight) |
| Reentry planform loading, kgm/m² | 119 | 94 | 110 | 108 | 108 | 119 |
| Cargo bay, m | 3.7 × 9.1 | 3.7 × 9.1 | 3.7 × 9.1 | 3.7 × 9.1 | 3.7 × 9.1 | 3.7 × 9.1 |
| Cargo density, kgm/m³ | 143 | 79 | 98 | 138 | 111 | 86 |
| Reentry cross-range, km | ±8,300 | ±8,300 | ±8,300 | ±8,300 | ±8,300 | ±8,300 |
| Crew, if required | 2 | 2 | 2 | 2 | 2 | 2 |

Mixed Density-Impulse Propulsion

Figure 6A:
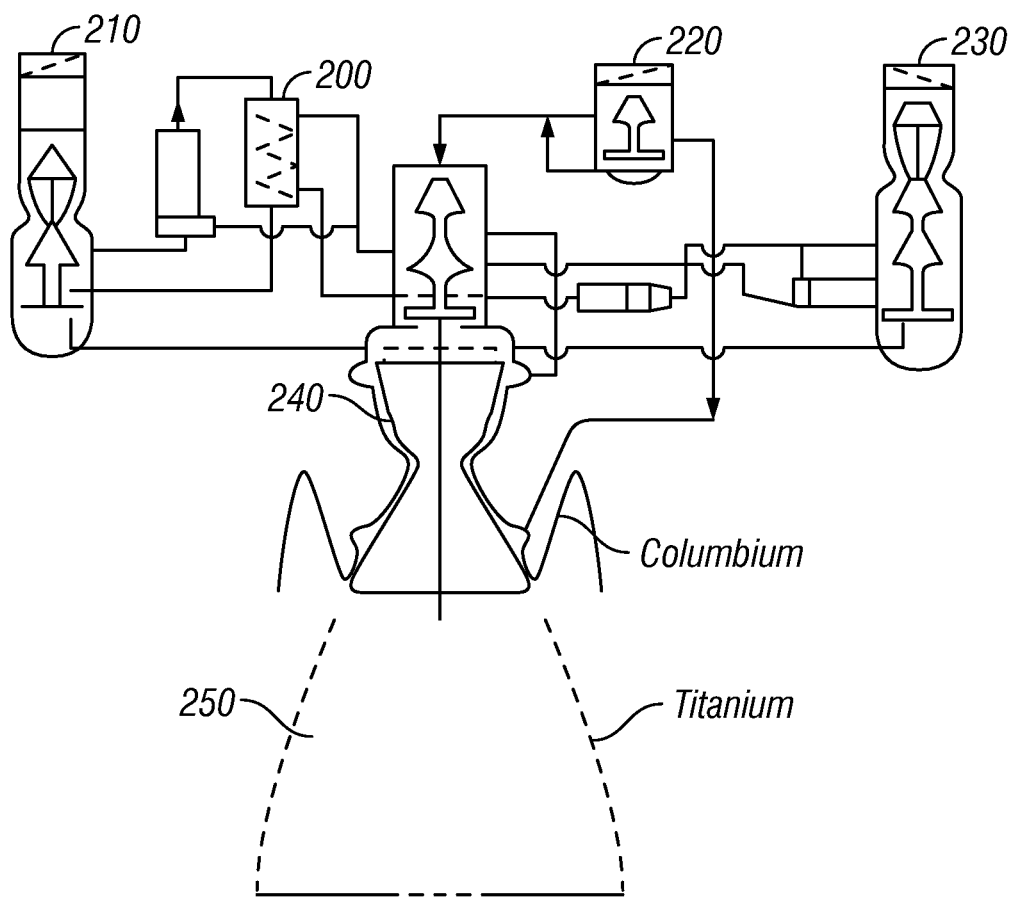
FIGS. 6A-6B depict a dual fuel engine cycle schematic and a dual fuel $O_2$/MMH/$H_2$ engine.
Figure 6B:
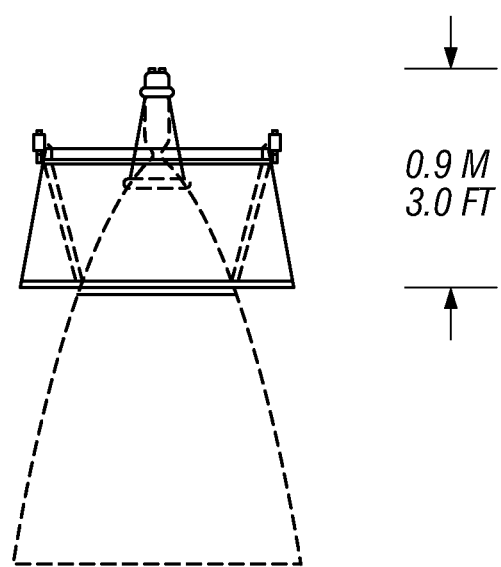

A mixed density-impulse propulsion principle may optionally used by the vehicle, which enables the use of smaller engines. This principle is also called "mixed-mode," "dual-fuel", or "tripropellant." An oxygen-monomethylhydrazine-hydrogen ($O_2$/MMH/$H_2$) orbit-to-orbit "tug," can attain round trip geosynchronous cargo to gross mass and cargo to dry mass ratios, 21% and 47% respectively, higher than an $O_2$/$H_2$ tug of equal LEO gross start mass. (See R. Salkeld and R. Beichel, "Mixed-Mode Proplulsion for Full Capability Space Tugs", AAS-75-162, $21^{st}$ MS Annual Meeting, Denver, Colo., August 1975, incorporated herein by reference.) These benefits are realized even when the tug is shortened by 40-60 percent. The $O_2$/MMH/$H_2$ engine design is described in FIG. 6A, which shows an example dual fuel engine cycle schematic comprising heat exchanger 200, MMH supply 210, LOX supply 220, LH$_2$ supply 230, regenerative cooling region 240, and radiation cooling region 250. Preferred materials are indicated. FIG. 6B is a schematic of a dual fuel $O_2$/MMH/$H_2$ engine producing a vacuum thrust of approximately 20,000 pounds (LBF). Table 6 below compares engine characteristics for different engine versions. A gas-gas staged-combustion cycle can be adopted to allow stable dual-fuel operation with a common injector and combustion chamber. The $O_2$/MMH/$H_2$ propellant combination and engine design described above can be incorporated into the present invention to take advantage of the superior cargo to gross mass and cargo to dry mass ratios.

TABLE 6

| Engine Characteristics | Basic ($O_2$ MMH) | Dual Fuel Version ($O_2$/MMH/$H_2$) | Hydrogen Version ($O_2$/$H_2$) |
|---|---|---|---|
| Vacuum Thrust (lb) | 20,000 | 20,000/13,500 | 13,500 |
| Specific Impulse (sec) | 393 | 393/469 | 469 |
| Expansion Ratio ($A_e/A_t$) | 400 | 400 | 400 |
| Chamber Pressure (psia) | 2,700 | 2,700/1,800 | 1,800 |
| Mixture Ratio (O/F) | 1.70 | 1.70/7.0 | 7.0 |
| Oxidizer Flow (lb/sec) | 12.0 | 12.0/25.2 | 25.2 |
| Fuel Flow (lb/sec) | 18.9 | 18.9/3.6 | 3.6 |
| Engine Weight (lb) | | | |
| Fixed Nozzle | 270 | 310 | 270 |
| Rolling Nozzle | 300 | 340 | 300 |

Figure 7A:
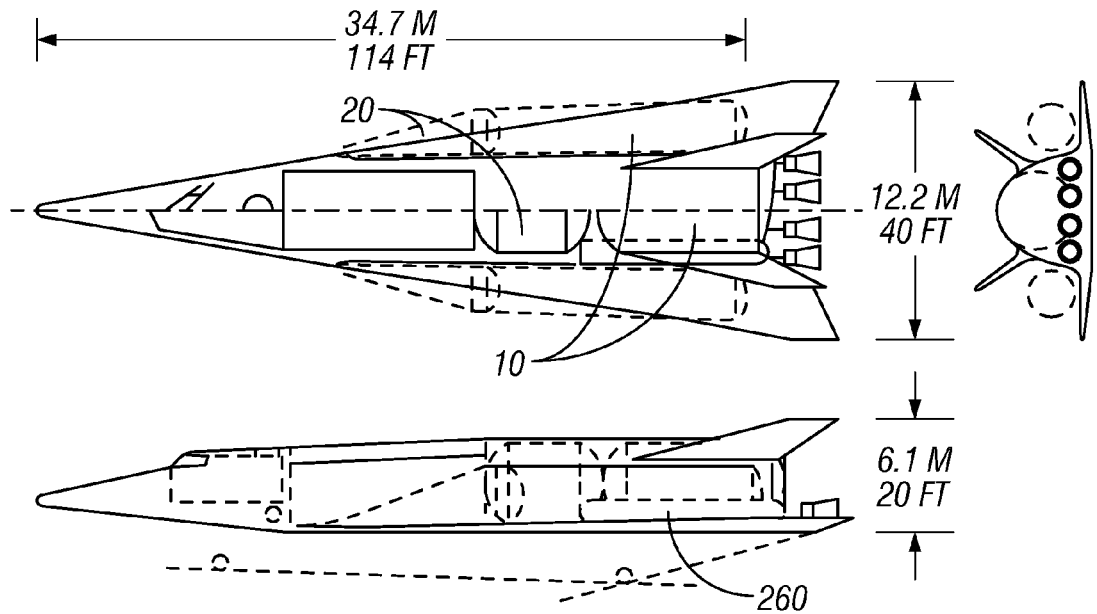
FIGS. 7A-7B depict dual fuel CFD and IFD Endloader configurations of the present invention.
Figure 7B:
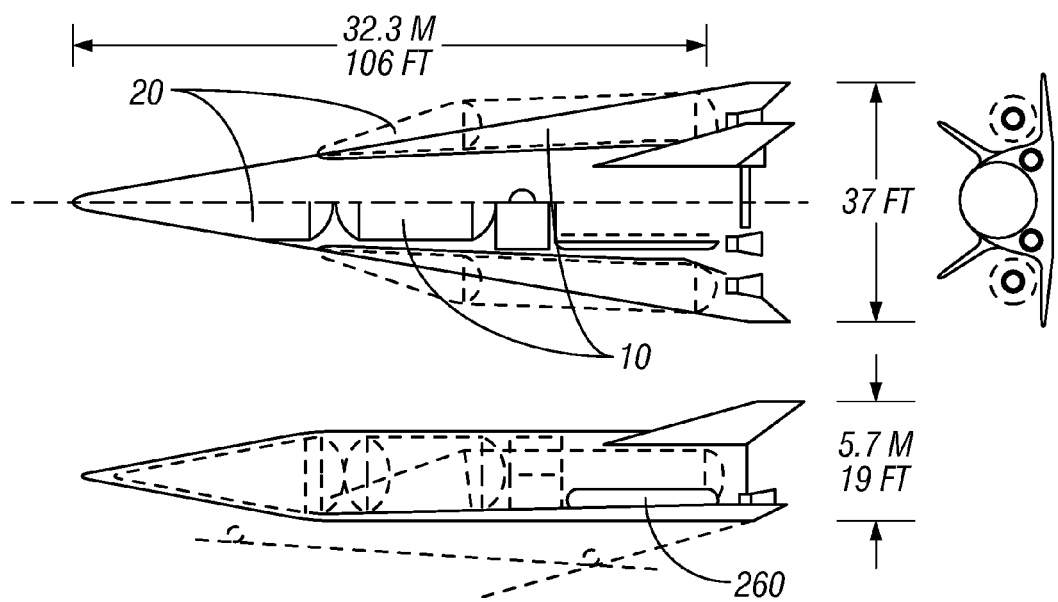

FIG. 7A depicts an $O_2$/MMH/$H_2$ CFD configuration. The preferred location of MMH tank 260 is indicated. Because the small size of the $O_2$/MMH/$H_2$ engine permits shifting the cargo bay fully aft, the weight and complexity of side-loading cargo bay doors may be eliminated and the overall vehicle size and dry mass is reduced, resulting in an $O_2$/MMH/$H_2$ IFD "Endloader" (EL) configuration, shown in FIG. 7B. Table 7 below compares the CFD and EL configurations.

TABLE 7

| | "Conventional" Flight Deck | | | "Endloader" | | |
|---|---|---|---|---|---|---|
| | Delta IV Heavy Launcher | | | | | |
| | Baseline | Deriv. (7 Seg.) | | Baseline | Deriv. (7 seg.) | |
| | Destination | | | | | |
| Parameter | LEO | LMO (LEO Refuel) | LMO (Direct flight) | LEO | LMO (LEO Refuel) | LMO (Direct flight) |
| Cargo, round trip, kgm | 13,100 | 17,000 | 7,800 | 15,700 | 14,100 | 10,900 |

TABLE 7-continued

| | "Conventional" Flight Deck | | | "Endloader" | | |
|---|---|---|---|---|---|---|
| | Delta IV Heavy Launcher | | | | | |
| | Baseline | Deriv. (7 Seg.) | | Baseline | Deriv. (7 seg.) | |
| | Destination | | | | | |
| Parameter | LEO | LMO (LEO Refuel) | LMO (Direct flight) | LEO | LMO (LEO Refuel) | LMO (Direct flight) |
| Gross start weight, kgm | 55,700 | 110,300 | 121,200 | 55,700 | 91,500 | 123,300 |
| Dry Weight, kgm | 15,500 | 15,500 | 16,500 | 12,700 | 12,700 | 14,500 |
| Engines ($O_2$/MMH/$H_2$) | 2 | 2 | 3 | 2 | 2 | 4 |
| Reentry planform loading, kgm/m$^2$ | 119 | 135 | 101 | 119 | 112 | 119 |
| Cargo bay, m | 3.7 × 9.1 | 3.7 × 9.1 | 3.7 × 9.1 | 3.7 × 9.1 | 3.7 × 9.1 | 3.7 × 9.1 |
| Cargo density, kgm/m$^3$ | 135 | 176 | 82 | 163 | 147 | 86 |
| Reentry cross-range, km | ±8,300 | ±8,300 | ±8,300 | ±8,300 | ±8,300 | ±8,300 |
| Crew, if required | 2 | 2 | 2 | 2 | 2 | 2 |

Results indicate that for essentially the same vehicle mold lines as the CFD configuration, the dual-fuel option discussed above offers about 100% and 50% increases in far space round trip cargo to dry mass and cargo to gross mass respectively, when fully refueled in LEO, but 10-25% decreases for LEO and direct far space flight because of the assumed limitations on ascent start mass and staging velocity. However, because of the smaller vehicle size and dry mass, compared to the $O_2$/$H_2$ CFD reference vehicle, the EL dual-fuel design provides not only about 100% and 50% increases in far space round trip cargo to dry mass and cargo to gross mass respectively when fully refueled in LEO, but about 35% and 10% increases in these ratios for round-trip LEO and direct flight far space missions.

Shuttles On Heavy Launchers

In addition to the above possibility of using the contemplated vehicle to replace high energy upper stage (HEUS) and payload of Delta IV Heavy launchers, the present invention can similarly be incorporated in other heavy launchers, such as a hypothetical Atlas V Heavy, where it could replace the Centaur upper stage and payload, with about the same performance as with the Delta IV Heavy. Alternatively an embodiment of the present invention could substitute for the B5-A H28 upper stage of the flight-demonstrated European Ariane 5 ECB heavy launcher. Other possibilities include using heavier launchers consisting of first generation shuttle boost and other existing boost elements.

Figure 8:
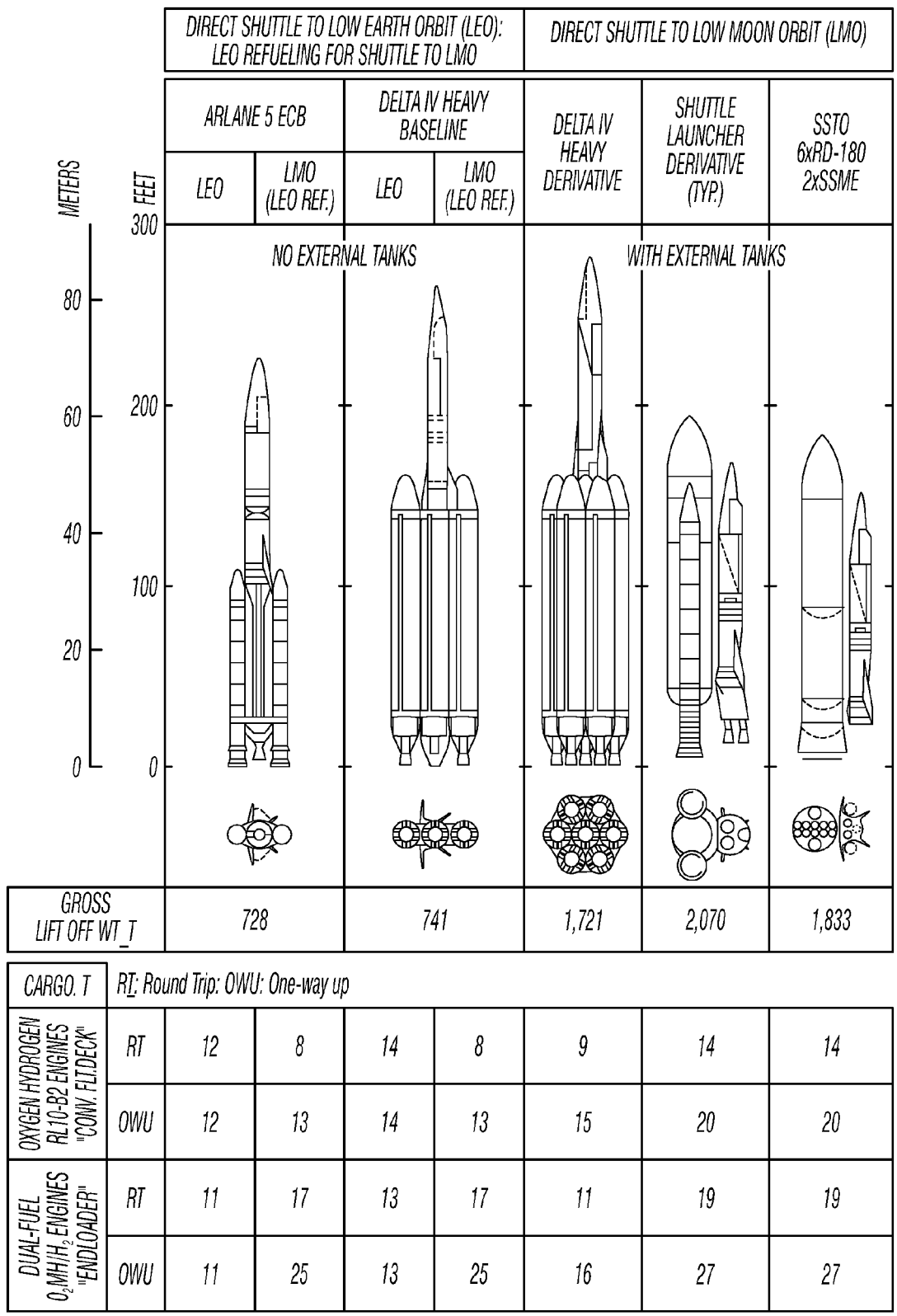
FIG. 8 depicts five boosted launch options usable with the present invention.

FIG. 8 shows liftoff weights and cargo capacities in tons for five such launch options, all pictured with the single fuel CFD configuration described above. The "Shuttle Launcher Derivative" is similar to various NASA shuttle element combinations, which can place 100 metric tons in LEO. The "SSTO" utilizes a development of the 8.7 m diameter shuttle external tank with existing RD-180 and Space Shuttle Main Engines (SSME) to enable an oxygen-kerosene-hydrogen single-stage-to-orbit heavy launcher also sized to place 100 metric tons in LEO. Once in LEO, any or all SSTO engines can be returned for use, for example in a shuttle cargo bay.

Far Space and Cargo Considerations

Transport operations to and from Earth-Moon libration points L1 and L2 are potentially of interest for scientific and operational reasons. Round-trip velocity requirement between LEO and either L1 or L2 are about 1 km/sec less than between LEO and LMO. Therefore, shuttle cargo capabilities are increased. For example, for single fuel CFD and dual fuel EL shuttles as upper stages for the Delta IV Heavy launcher, L1 and L2 round trip cargos are about 15 tons and 23 tons respectively, compared with 8T and 17 T for the LMO round trip. These gains, as well as the dual-fuel advantage, are similar for the other four Earth launchers considered.

The present invention preferably comprises reusable vehicles that can serve as upper stages of existing or foreseeable Earth launchers, can perform shuttle missions to low Earth orbits (LEO), and with LEO refueling, or direct flight (with or without external tanks) from heavier Earth launchers, to far space orbits such as LMO or to Earth-Moon libration points (L1; L2). The present invention may be configured to be compatible with known aerodynamic and thermostructural technologies, existing rocket engines and known engine technologies.

Use of internal control stations rather than conventional cockpits, and dual-fuel ($O_2$/MMH/$H_2$) rather than single-fuel ($O_2$/$H_2$) propulsion, lead to more efficient vehicle volume utilization and increased system performance. Specifically, dual-fuel propulsion can increase cargo to gross mass and cargo to dry mass ratios by up to 50% and 100% respectively, depending on operational mode, and make possible "Endloader" (EL) configurations, thereby shrinking the vehicle and eliminating heavy sideloading cargo doors.

Figure 9:
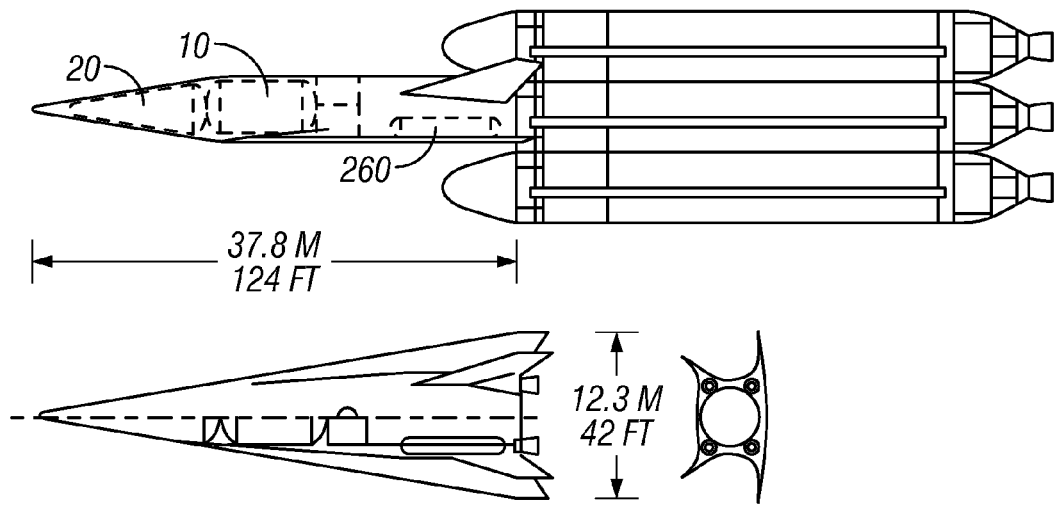
FIG. 9 depicts an EL configuration with an enlarged cargo bay.

The above disclosed embodiments are normalized to the same cargo bay size, 3.7×9.1 m (12×30 ft.), or about 96 m$^3$. An estimated range of LEO cargo masses of 10-15 tons indicates average cargo densities of 104-156 kg/m$^3$ (6.5-9.8 lb/ft$^3$), which is in the upper range of what is commonly considered realistic. However, for the estimated range of far space cargo masses of 10-30 tons (perhaps larger, if lunar propellants refueling is contemplated), cargo densities increase unrealistically for the 3.7×9.1 m bay size. This suggests that larger cargo bays may merit consideration, and that the EL design may be advantageous. An example of an EL configuration with an enlarged cargo bay of approximately 4.6×12.2 meters (15×40 ft), depicted on a Delta IV Heavy Launcher, is shown in FIG. 9. The round trip cargo for this configuration for LEO is approximately 8.9 tons and is approximately 12.7 tons for LMO with LEO refueling. The gross start mass is 106.2 tons, and the dry mass is 18.7 tons. Thus the cargo volume is more than doubled, and the cargo mass is decreased by the 4-5 ton increase in shuttle dry mass. Alternatively, for one way up cargo, external cargo bays may be employed.

Figure 10A:
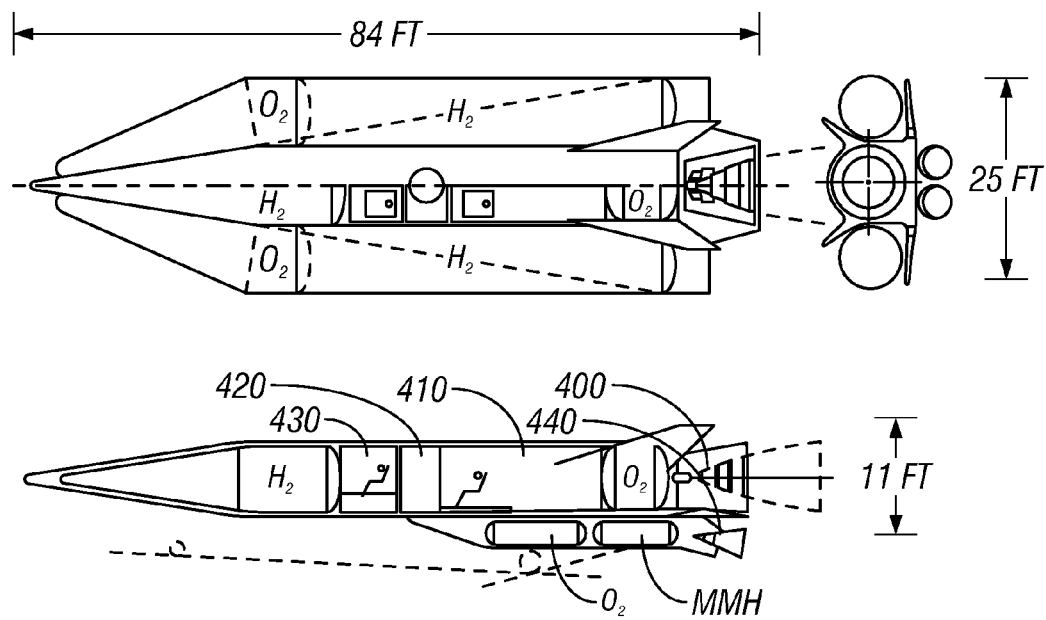
FIG. 10A depicts an extended mission configuration of an embodiment of the present invention.
Figure 10B:
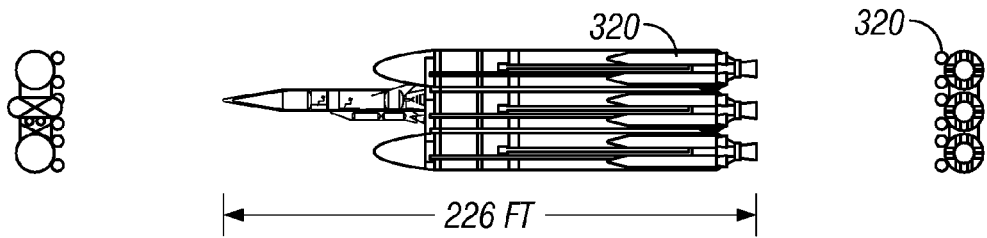
FIG. 10B shows the embodiment of FIG. 10A configured with a ΔIV Heavy derivative.

FIG. 10 depicts an extended mission version of the present invention, preferably comprising additional life support, internal operations volume, and storable propulsion for extended missions (e.g. up to about fifty days or more for a crew of four). Such missions could include exploration visits to Earth-approaching asteroids, Earth-Sun Lagrangian points, or servicing and repair of distant astrophysical systems. Example parameters are shown in Table 8. The vehicle of this embodiment preferably comprises 1×RL or MB-60 engine 400, operations bay 410 (preferably about 18 feet in length), utility bay 420, and flight deck 430. In this embodiment, post-escape maneuvers and Earth-return require a total velocity gain of approximately 5900 ft/sec (1.2 km/sec), which is preferably provided by two expendable propulsion pods preferably using oxygen monomethylhydrazine propellants and the $O_2$/MMH engine 440 described herein. These propellants, adequately insulated, are considered storable for this mission time frame. Alternate storable propellant combinations such as oxygen/methane may be used, but these may have different tradeoffs of performance, cost, and operational benefits. As shown in FIG. 10B, this embodiment can be the upper stage of a ΔIV Heavy derivative using 6 GEM-60 solid rocket motors 320, as disclosed in IAC 05-D2.3.08, "Geolunar Shuttle as Upper Stage for Heavy Earth Launchers," 56th IAC, Fukuoka, Japan, October 2005, incorporated herein by reference. This vehicle combination has a gross liftoff weight of approximately 978 tons.

TABLE 8

| Parameter | CORE VEHICLE | EXPENDABLES | |
|---|---|---|---|
| | | $O_2$/$H_2$ TANKS (2) | $O_2$/MMH PODS (2) |
| Cargo | | | |
| Personnel (4) | 1000 | — | — |
| Env. contr./life supp. (50 days) | 9000 | | |
| Mission equipment | 2000 | | |
| Gross start mass, lbm | 58,700 | 115,200 | 17,100 |
| Dry mass, lbm | 20,700* | 5200 | 800 |
| Engines | 1×RL or MB-60 | — | 1×$O_2$/MMH |
| Reentry planform loading, lbm/m² | 20.3 | — | — |
| Reentry cross-range, km | ±4,500 | — | — |

*Including 15% margin

Figure 11A:
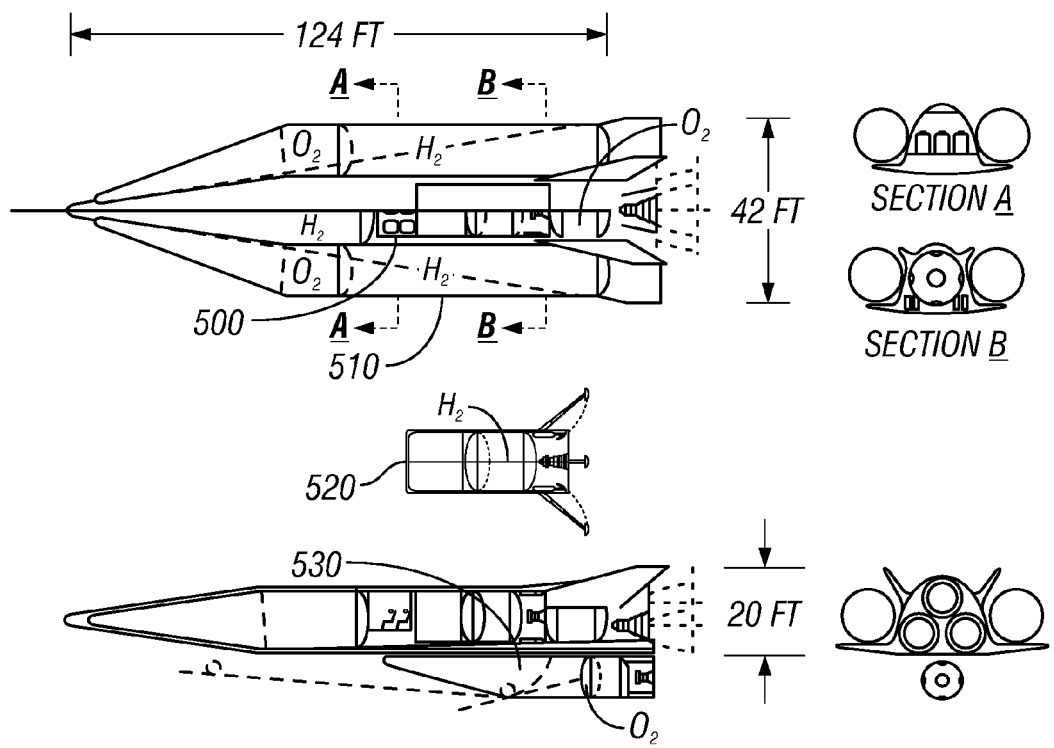
FIG. 11A depicts an embodiment of the present invention capable of LMO with a moon lander.
Figure 11B:
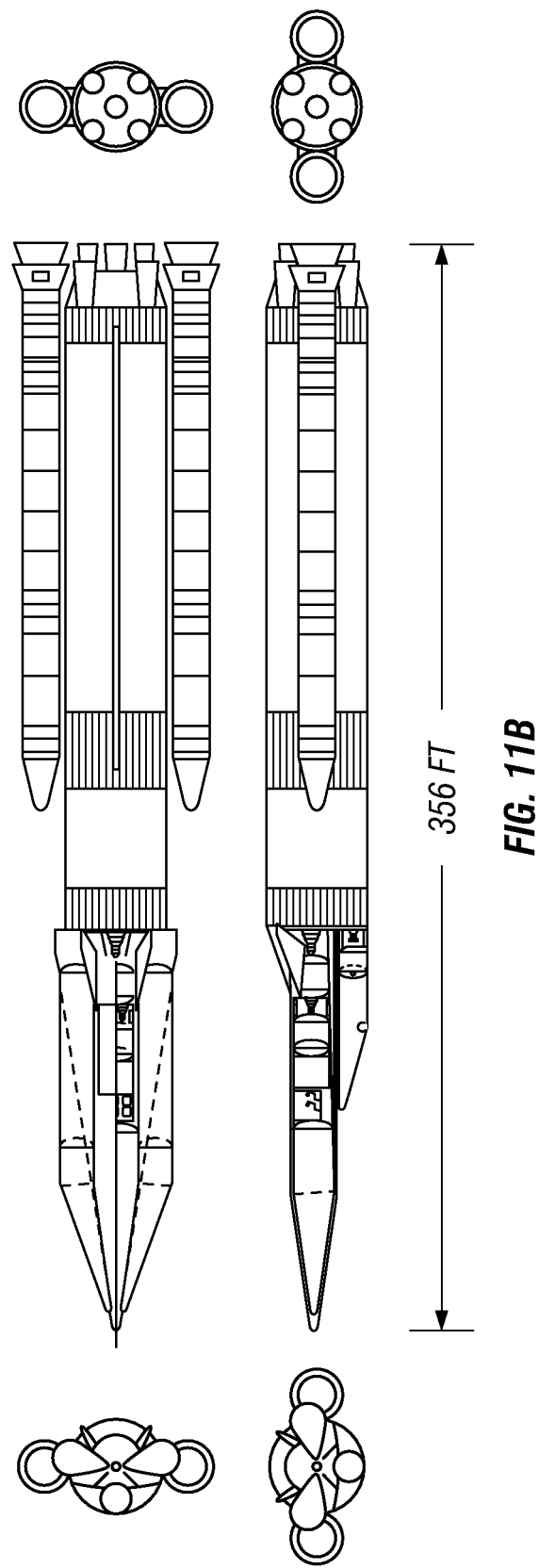
FIG. 11B shows the embodiment of FIG. 11A together with the Ares V Heavy Earth launchers.

FIG. 11A presents a direct space far space shuttle embodiment which can serve as the upper stage for the projected Ares V heavy Earth launcher. This embodiment preferably comprises a crew of two 500 and external tanks 510. The vehicle can attain LMO preferably carrying two separable propulsive elements: (1) crewed moon lander/ascent vehicle 520 carrying the equivalent of four people and one ton of mission equipment to and from the Moon surface from LMO, which is preferably carried within the 12×30-foot internal cargo bay; and (2) unmanned expendable moon lander 530 which can deliver 7.1 tons of cargo to the moon surface from LMO, which is preferably carried externally on the vehicle itself. The vehicle is preferably propelled by three RL or MB-60 rocket engines, and each of the separable vehicles is preferably propelled by one RL-10 engine (which comprises a nozzle expansion ration ϵ=77). Specifications for this embodiment are in Table 9. The vehicle is shown in FIG. 11B on an Ares V heavy Earth launcher, with a gross liftoff weight of approximately 3700 tons.

TABLE 9

| | MOON ORBIT SHUTTLE WITH ARES V | | | | LEO |
|---|---|---|---|---|---|
| | RESUABLE | | EXPENDABLE | | |
| Parameter | CORE VEHICLE | MOON CREW LANDER[c] | EXTERNAL TANKS | MOON CARGO LANDER (ONE WAY UP) | SHUTTLE WITH ΔIV HEAVY |
| Cargo | | | | 14,300 | 19,400[c] |
| Personnel | 6(12) | 4(4) | — | — | 2(10) |
| Env. contr./life supp. | 7500 | 1000 | — | — | 2000 |
| Mission equipment | — | 2000 | — | — | — |
| Gross start mass, lbm | 220,800 | 36,100 | 463,100 | 28,500 | 157,400 |
| Dry mass, lbm | 48,600[a] | 12,100[b] | 23,200 | 4100[b] | 41,800[a] |
| Engines | 3×RL or MB-60 | 1×RL-10 | — | 1×RL-10 | 1×RL-10B-2 |
| Cargo bay, ft | 12 × 30 | 11 × 11 | — | (0-9) × 45[d] | 12 × 30 |
| Cargo density, lbm/ft³ | 10.6/3.6 | 4.8 | — | 7.9 | 7.9 |
| Re-entry planform loading, lbm/m² | 23 | — | — | — | 25 |
| Re-entry cross-range, n. mi. | ±4,500 | — | — | — | ±4,500 |

[a]Including 15% margin
[b]Including 10% margin
[c]Round trip
[d]Tapered

Figure 11C:
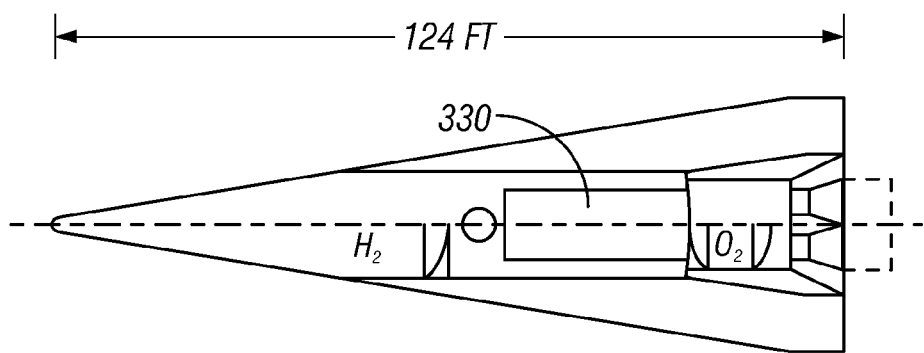
FIG. 11C shows an LEO version of the embodiment of FIG. 11A.
Figure 11D:
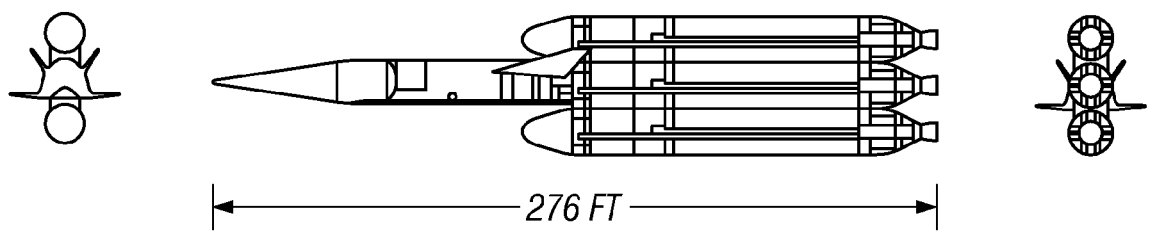
FIG. 11D shows the embodiment of FIG. 11C together with a ΔIV Heavy Earth launcher.

FIG. 11C shows a LEO version of this embodiment, which is preferably propelled by 2×RL10B-2 engines and preferably comprises cargo bay 330 (preferably 12×30 ft.). This version can attain LEO (220 nautical miles, 28.7°) as an upper stage of the ΔIV Heavy Earth launcher with a round-trip cargo of the equivalent of two people and ten tons, and having a gross liftoff weight of approximately 835 tons, as shown in FIG. 11D. The last column of Table 9 includes parameters for this configuration.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all patents, references, and publications cited above are hereby incorporated by reference.

What is claimed is:

1. A method of travelling to far space, the method comprising the steps of:
    launching a space vehicle comprising a booster and a reusable propulsive upper stage rigidly attached to the booster;
    separating the upper stage from the booster so that immediately upon separation from the booster the upper stage continues in the same direction as the booster;
    activating upper stage propulsion within the atmosphere;
    the upper stage performing direct flight from ignition within the atmosphere; and
    the upper stage re-entering Earth's atmosphere from far space;
    the upper stage having a sufficiently high hypersonic lift to drag ratio to enable said upper stage to remain at high altitude long enough to dissipate thermal energy until it decelerates to Low Earth Orbit velocity;
    wherein the upper stage does not enter or exit Low Earth Orbit during ascent to far space.

2. The method of claim 1 wherein the launching step comprises launching from the earth's surface or from an air launch platform.

3. The method of claim 1 further comprising the step of decelerating the upper stage in preparation for re-entry.

4. The method of claim 1 further comprising the step of the upper stage landing horizontally on Earth's surface.

5. The method of claim 4 wherein the landing step comprises gliding.

6. The method of claim 1 further comprising providing an internal bay in the upper stage for transporting a separately propulsive vehicle comprising a fuel supply.

7. The method of claim 6 wherein the separately propulsive vehicle comprises a characteristic selected from the group consisting of single stage, no-aerodynamic, and reusable.

8. The method of claim 6 further comprising the step of the separately propulsive vehicle traveling to a desired location and returning to the upper stage.

9. The method of claim 8 comprising the separately propulsive vehicle traveling between Low Moon Orbit and the moon.

10. The method of claim 9 further comprising the step of the separately propulsive vehicle landing on the moon.

11. The method of claim 6 further comprising the step of the separately propulsive vehicle returning to earth while being transported in the bay.

* * * * *

UNITED STATES PATENT AND TRADEMARK OFFICE
CERTIFICATE OF CORRECTION

| | | |
|---|---|---|
| PATENT NO. | : 8,534,598 B2 | Page 1 of 1 |
| APPLICATION NO. | : 12/115324 | |
| DATED | : September 17, 2013 | |
| INVENTOR(S) | : Salkeld | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 625 days.

Signed and Sealed this
Sixteenth Day of December, 2014

Michelle K. Lee
*Deputy Director of the United States Patent and Trademark Office*